(12) United States Patent
Cho (10) Patent No.: US 8,132,545 B2
(45) Date of Patent: Mar. 13, 2012

(54) APPARATUS FOR GENERATING STEAM

(75) Inventor: Kook Hyun Cho, Incheon-si (KR)

(73) Assignees: Kook Hyun Cho, Incheon (KR); Unibell Co., Ltd., Siheung (KR)

( * ) Notice: Subject to any disclaimer, the term of this patent is extended or adjusted under 35 U.S.C. 154(b) by 775 days.

(21) Appl. No.: 12/180,619

(22) Filed: Jul. 28, 2008

(65) Prior Publication Data

US 2009/0025657 A1  Jan. 29, 2009

(30) Foreign Application Priority Data

Jul. 26, 2007  (KR) .................. 10-2007-0075088

(51) Int. Cl.
F22B 27/16 (2006.01)
(52) U.S. Cl. ............................................. 122/40; 159/3
(58) Field of Classification Search .................. 122/4 A, 122/40; 159/3, 4.4, 22
See application file for complete search history.

(56) References Cited

U.S. PATENT DOCUMENTS

| | | | | |
|---|---|---|---|---|
| 2,790,428 A * | 4/1957 | Buttler | ............................ | 122/156 |
| 3,885,390 A * | 5/1975 | Evans | ............................ | 60/531 |
| 3,910,812 A * | 10/1975 | Kaneko et al. | ..................... | 159/3 |
| 4,217,176 A * | 8/1980 | Antony | .......................... | 202/173 |
| 4,622,820 A * | 11/1986 | Sundquist | ........................ | 60/673 |
| 5,120,490 A * | 6/1992 | Koshiishi et al. | ............. | 376/282 |
| 5,259,341 A * | 11/1993 | Person | .......................... | 122/31.1 |
| 5,666,910 A * | 9/1997 | George et al. | ................... | 122/40 |
| 2003/0165628 A1 * | 9/2003 | Simmons et al. | ............. | 427/421 |

FOREIGN PATENT DOCUMENTS

| | | |
|---|---|---|
| JP | 08-110001 | 4/1996 |
| JP | 2003-266004 | 9/2003 |
| KR | 1020040103606 | 12/2004 |
| KR | 1020070099431 | 10/2007 |

* cited by examiner

*Primary Examiner* — Gregory A Wilson
(74) *Attorney, Agent, or Firm* — IPLA P.A.; James E. Bame

(57) ABSTRACT

An apparatus for generating high temperature steam according to the present invention comprises a high pressure container including a hollow body having a certain volume and sealed shape and a vapor outlet formed at an upper or lower portion of the body for discharging vapor generated therein; a heat supply unit for supplying high temperature heat to the high pressure container; a water supply pump positioned at an outside of the high pressure container and supplying the high pressure container with water from an outside; a spray nozzle for spraying the water supplied from the water supply pump to the high pressure container; and a vapor discharge line connected to the outlet of the high pressure container to guide the vapor generated in the body.

6 Claims, 6 Drawing Sheets

APPARATUS FOR GENERATING STEAM

CROSS REFERENCE

This application claims foreign priority under Paris Convention and 35 U.S.C. §119 to Korean Patent Application No. 10-2007-0075088, filed Jul. 26, 2007 with the Korean Intellectual Property Office.

BACKGROUND OF THE INVENTION

1. Field of the Invention

The present invention relates to an apparatus for generating high-pressure steam that is essential in industrial fields, and more particularly, to an apparatus and method for generating more efficiently and economically high temperature steam used in industrial fields.

2. Description of the Related Art

In order to obtain steam of high temperature and pressure in industrial fields, industrial water is generally heated in a boiler at high temperature and pressure to generate the steam of high temperature and pressure. It has been found that steam ordinarily obtained by means of such a conventional method has a temperature of about 140° C. and is maintained at a pressure of about 12 $kg/cm^2$, whereas better-quality steam required depending on industrial fields has a temperature of about 180° C. and is maintained at a pressure of about 15 $kg/cm^2$.

Such a conventional method for generating steam employs a phenomenon by which water in a liquid phase is vaporized into gaseous water vapor through phase change at about 100° C. under the atmospheric pressure and the temperature of the gaseous water vapor is raised due to an increase in the internal energy of the gaseous water vapor under high pressure.

However, when water in a liquid phase is heated in a conventional boiler in such a conventional method, a large amount of heat should be applied to the water so as to vaporize the water in the boiler. This means that the entire water contained in the boiler should be heated to be vaporized and resulting water vapor should be further heated to a desired temperature in order to generate steam. Therefore, the conventional method for generating steam has disadvantages in that an excessive amount of energy should be input and the amount of generated steam is small as compared to the amount of input energy.

Moreover, although a large amount of energy is supplied to the boiler in the conventional method, most of the supplied energy continuously vaporizes water contained in the boiler to generate water vapor and it is not possible to further raise the temperature of the generated water vapor. Thus, there are disadvantages in that the temperature of the generated water vapor is limited (e.g., to 180° C.) and it is not possible to obtain water vapor of a high temperature greater than 180° C.

In addition, the conventional method for generating steam has a disadvantage in that a large-sized boiler should be equipped to generate water vapor, resulting in increased investment costs.

Furthermore, according to the conventional method for generating steam, in view of safety, facilities such as a boiler that actually generate water vapor are installed at locations far away from places where the water vapor are to be actually used. Thus, a lot of utility facilities including pipe lines are required to carry the generated water vapor to the places where the water vapor is to be actually used. Therefore, the conventional method for generating steam has problems in that high maintenance costs in addition to the high investment costs are required, leading to increase of steam generation costs.

As described above, a conventional method for generating steam has inherent problems in that a small amount of steam is generated for input energy, a greater amount of energy is required when steam with a temperature higher than a typical temperature is needed, and it is not possible to obtain steam with an ultra-high temperature of 200° C. or more.

SUMMARY OF THE INVENTION

Accordingly, an object of the present invention is to provide an apparatus and a method for efficiently generating high temperature steam, wherein input energy is absorbed more efficiently into fine water particles to greatly improve the amount of water vapor for use in industrial fields and to further increase the temperature of the water vapor.

An apparatus for generating high temperature steam according to the present invention comprises a high pressure container including a hollow body having a certain volume and sealed shape and a vapor outlet formed at an upper or lower portion of the body for discharging vapor generated therein; a heat supply unit for supplying high temperature heat to the high pressure container; a water supply pump positioned at an outside of the high pressure container and supplying the high pressure container with water from an outside; a spray nozzle for spraying the water supplied from the water supply pump to the high pressure container; and a vapor discharge pipeline connected to the outlet of the high pressure container for guiding the vapor generated in the body to the places where the vapor are to be actually used.

According to the present invention, the high pressure container preferably further comprises a heat transferring plate or an auxiliary heat supply unit provided therein.

In addition, according to the present invention, the high pressure container preferably further comprises a connecting cap.

A method for generating high temperature steam according to the present invention comprises the steps of: allowing an internal state of the high pressure container to reach a predetermined pressure or temperature; and spraying water supplied from the outside into the high pressure container if the internal state of the high pressure container reaches the predetermined pressure or temperature.

According to the present invention, it is preferable that the high pressure container have an initial set internal pressure of 3 to 5 $kg/cm^2$ and an initial set internal temperature of 120° C. or more.

In addition, according to the present invention, it is preferable that the predetermined pressure of the high pressure container be 10 to 40 $kg/cm^2$ and the predetermined temperature of the high pressure container be 150 to 300° C.

DESCRIPTION OF THE PREFERRED EMBODIMENT

Hereinafter, the present invention will be described in more detail with reference to the accompanying drawings.

Figure 1:
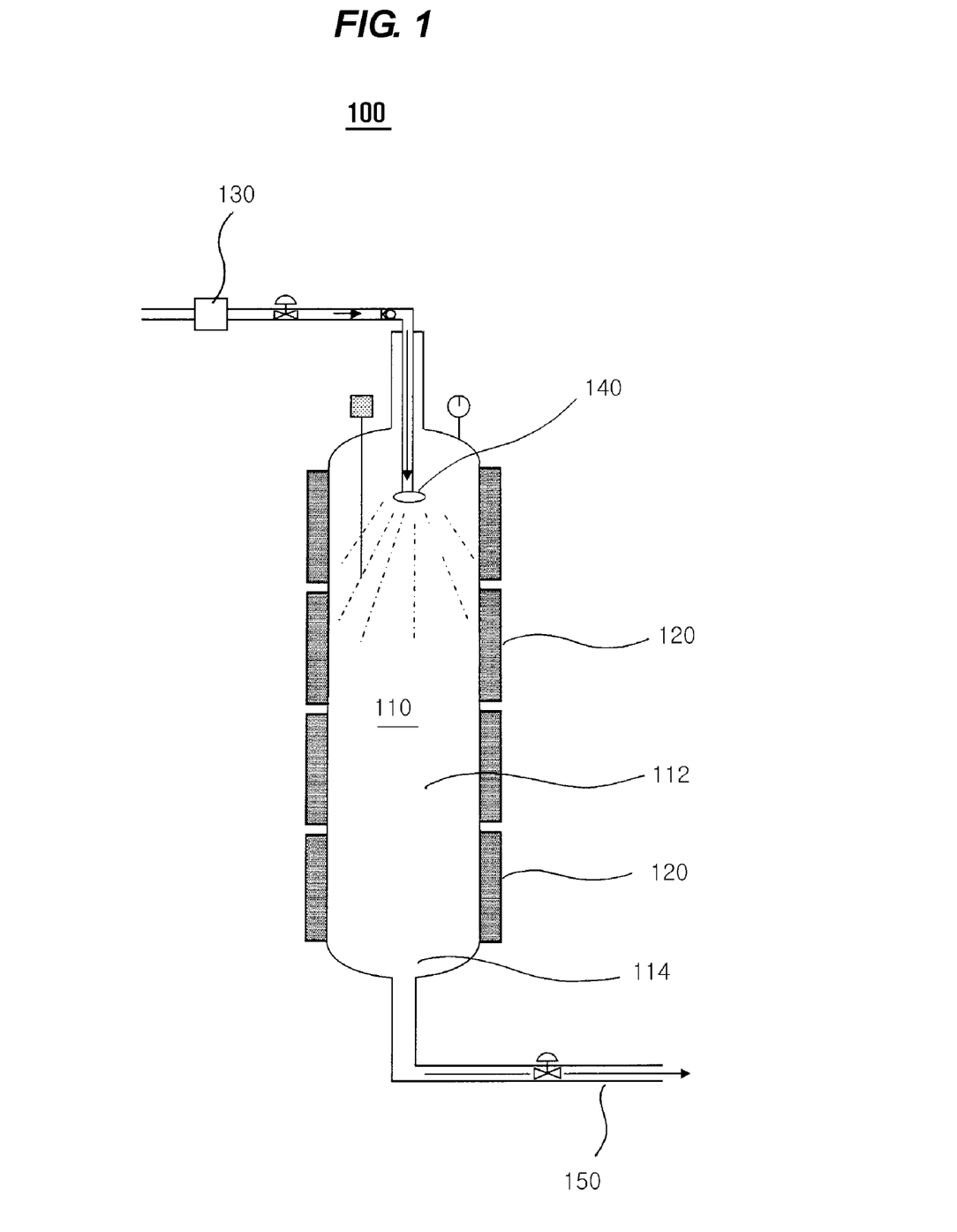
FIG. 1 is a schematic view of an apparatus 100 for generating high temperature steam according to the present invention.

FIG. 1 is a schematic view of an apparatus 100 for generating high temperature steam according to the present invention.

The apparatus 100 for generating high temperature steam according to the present invention comprises a high pressure container 110 for allowing water vapor to be generated therein. The high pressure container 110 provides a space in which fine waterdrops supplied from the outside absorb high temperature heat to generate high-pressure and high temperature water vapor. The high pressure container 110 is preferably a cylindrical container used in industrial fields.

According to the present invention, the high pressure container 110 comprises a hollow body 112. The body 112 has a certain volume and is hermetically sealed, so that an internal energy of water vapor existing in the body can be increased when the body is heated from the outside.

In the present invention, the body 112 comprises a vapor outlet 114 at an upper or lower portion thereof. The vapor outlet 114 is a path through which the vapor generated in the body is discharged to the outside. Although the vapor outlet 114 may be formed at the upper or lower portion of the body 112, it is more preferable that the vapor outlet be formed at the lower portion adjacent to the ground. This is because if the vapor outlet 114 is formed at the lower portion of the body, high temperature and pressure water pooled at the lower portion of the body 112 is discharged to the outside simultaneously when the vapor in the body 112 is discharged through the vapor outlet 114. In this state, the high temperature and pressure water instantaneously discharged is rapidly expanded in an instant, so that another vapor is generated advantageously.

According to the present invention, it is preferable that the high pressure container 110 further comprise a heat transferring plate 116 in the body 112. The heat transferring plate 116 is made of the same metal material as the body 112 and preferably in the shape of a plate. If the heat transferring plate is formed in the shape of a plate, heat transferring efficiency can be increased since an area of the heat transferring plate is broad. In order to secure free flow of the vapor, it is preferable to form a plurality of through holes on the heat transferring plate 116. In the present invention, it is preferable that the heat transferring plate 116 be coupled to the body in the longitudinal direction of the body 112. However, the heat transferring plate may be installed in the traverse direction of the body 112. In a case where the heat transferring plate 116 is coupled to the body, although a capacity of the high pressure container 110 is increased, rapid exchange of the thermal energy can be realized in the high pressure container and a process of generating vapor can be performed effectively. One to eight of the heat transferring plates 116 may be provided according to a capacity of the high pressure container 110.

According to the present invention, it is preferable that the high pressure container 110 further comprise a connecting cap 118 at the upper portion of the body 112. In a case where a plurality of the apparatuses for generating high temperature of the present invention are coupled sequentially to each other and then used, the connecting cap 118 can be used as a means for connecting a vapor discharge line 150 of the apparatus provided at a front thereof.

The apparatus 100 for generating high temperature steam according to the present invention comprises a heat supply unit 120 for supplying high temperature heat into the high pressure container 110.

In the present invention, the heat supply unit 120 is preferably a heater band attached to and wound on an outer surface of the body 112, and a pipe using heat medium may be used as the heat supply unit 120. The heat supply unit 120 converts electrical energy into thermal energy and then supplies high temperature heat to the body 112 of the high pressure container 110. When the high temperature heat is transferred to the high pressure container 110 by the heat supply unit 120, the internal energy of the vapor existing in the high pressure container 110 is increased. At this time, since the volume of the body 112 of the high pressure container 110 is constant, both the pressure and temperature of the vapor are naturally increased.

In the present invention, the heat supply unit 120 may be installed to an inner surface of the body 112. In a case where the heat supply unit 120 is installed to the inner surface of the body 112, there is an advantage in that the heat supply unit can transfer more directly high temperature heat to the vapor existed in the body 112.

In addition, according to the present invention, the heat supply unit 120 may further comprise an auxiliary heat supply unit 122 installed to the inner surface of the body 112. Preferably, the auxiliary heat supply unit 122 is formed inside of the body 112 to extend in the longitudinal direction. This is for the purpose of making it possible to promote more active heat exchange between the auxiliary heat supply unit 122 and the vapor existing inside of the body 112.

The apparatus 100 for generating high temperature steam according to the present invention comprises a water supply pump 130 positioned at the outside of the high pressure container 110.

In the present invention, the water supply pump 130 is placed at the outside of the high pressure container 110 to supply water to the high pressure container 110. A water pump or booster capable of supplying water at high pressure is preferably used as the water supply pump 130. Even in a case where an internal pressure of the high pressure container 110 is maintained at a remarkably high level during the work, the water supply pump 130 can overcome the internal pressure to allow water to be constantly supplied to the high pressure container 110. Purified water or industrial water is preferably used as the water. The water supplied from the outside by the water supply pump 130 is used as a raw material for generating steam in the high pressure container 110.

The apparatus 100 for generating high temperature steam according to the present invention comprises a spray nozzle 140 for spraying the water, which is supplied from the water supply pump 130, into the high pressure container 110.

In the present invention, the spray nozzle 140 is to spray the water, which is supplied from the water supply pump 130, in the form of fine waterdrops into the high pressure container 110. The fine waterdrops sprayed from the spray nozzle 140 are in an environment of high temperature and pressure as soon as being sprayed. The environment of high temperature and pressure is formed by the high temperature heat provided by the heat supply unit 120 installed in or out of the high pressure container 110.

In the present invention, the fine waterdrops are in the environment of high temperature and pressure immediately after spraying from the spray nozzle 140 and adsorb high temperature thermal energy through overall surfaces thereof in the environment of high temperature and pressure. Therefore, the internal energy of the fine waterdrops sprayed from the spray nozzle 140 is increased instantaneously and rapidly, and the volumes of the waterdrops are rapidly expanded while being converted into gas molecules (water vapor). At this time, since the high pressure container 110 is hermetically sealed and has a certain constant volume, the gas molecules (water vapor) are in high pressure and then high temperature. Due to the above interaction, abundant steam is generated in the high pressure container 110 within a very short time. Then, since the volume of the steam is rapidly increased, the steam of ultra-high pressure is generated within a limited space, and at the same time, the steam of ultra-high temperature can be also generated.

The apparatus 100 for generating high temperature steam according to the present invention comprises the vapor discharge line 150 connected to the outlet 114 of the high pressure container 110. In the present invention, the vapor discharge line 150 guides the steam generated in the body 112 to the places where the vapor are to be actually used.

In the present invention, if the discharging line 150 is coupled to the connecting cap 118 of another high pressure container 110, a plurality of the apparatuses for generating high temperature steam are sequentially connected to each other.

In the meantime, according to the present invention, unexplained reference numeral 10 designates a pipe line, reference numeral 20 designates a temperature measuring sensor for measuring internal temperature of the high pressure container 110, and reference numeral 30 designates a pressure measuring sensor for measuring internal pressure of the high pressure container 110.

Figure 2A:
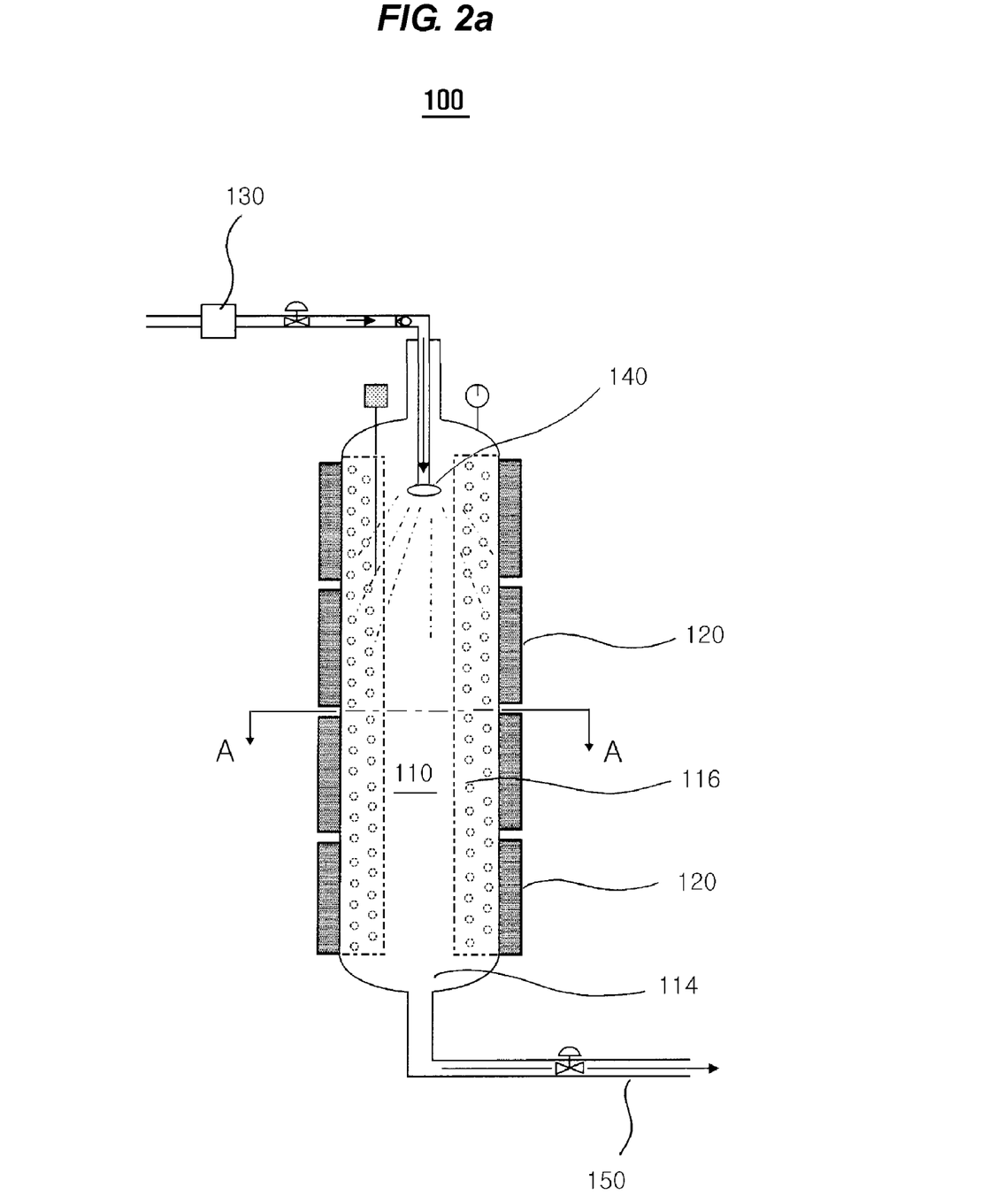
FIGS. 2a and 2b show schematic views of a modified embodiment of the apparatus 100 for generating high temperature steam.
Figure 2B:
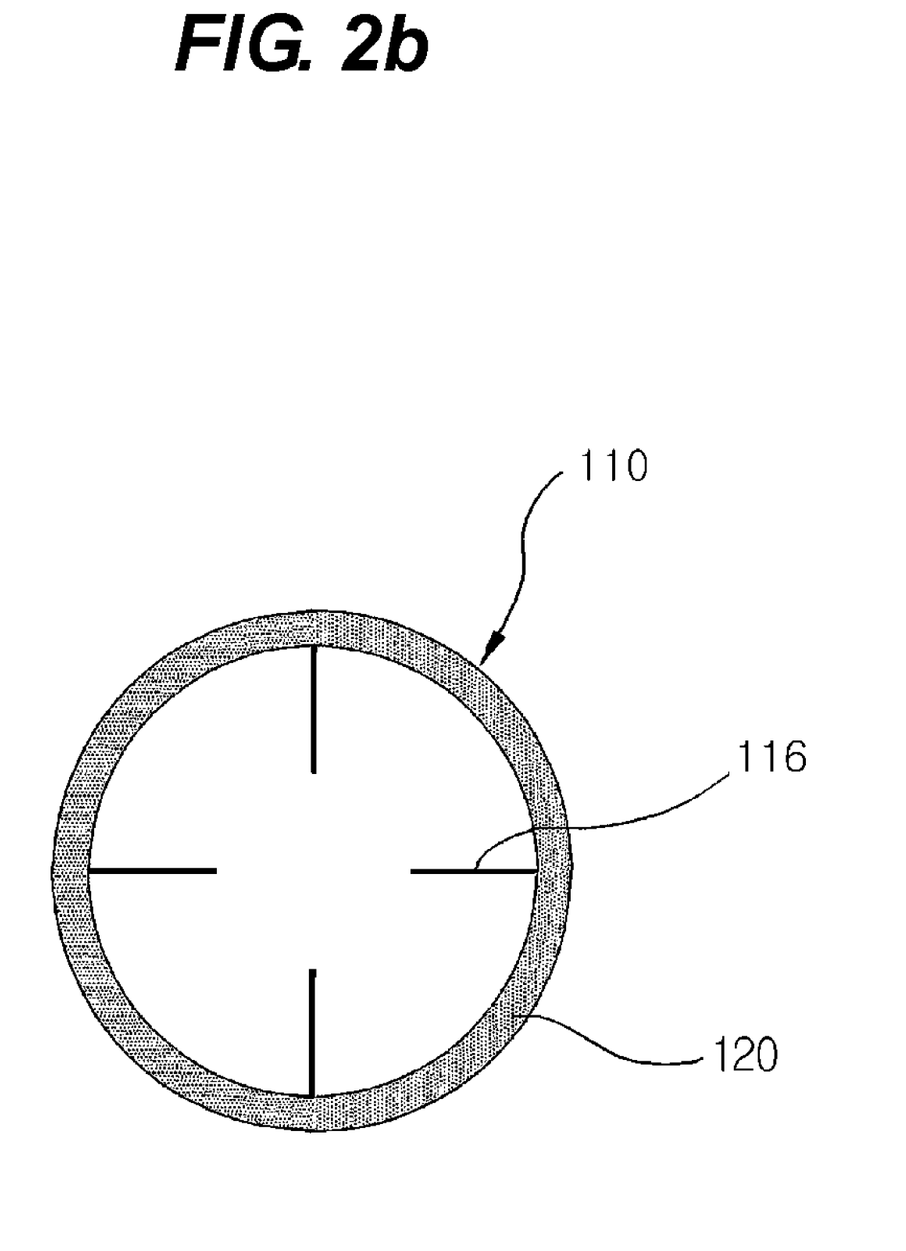

FIG. 2a schematically shows an embodiment in which the heat transferring plate 116 is provided in the high pressure container 110 of the apparatus 100 for generating high temperature steam according to the present invention, and FIG. 2b is a sectional view taken along line A-A in FIG. 2a.

In the present invention, the function and configuration of the heat transferring plate 116 has been described in detail above.

Figure 3:
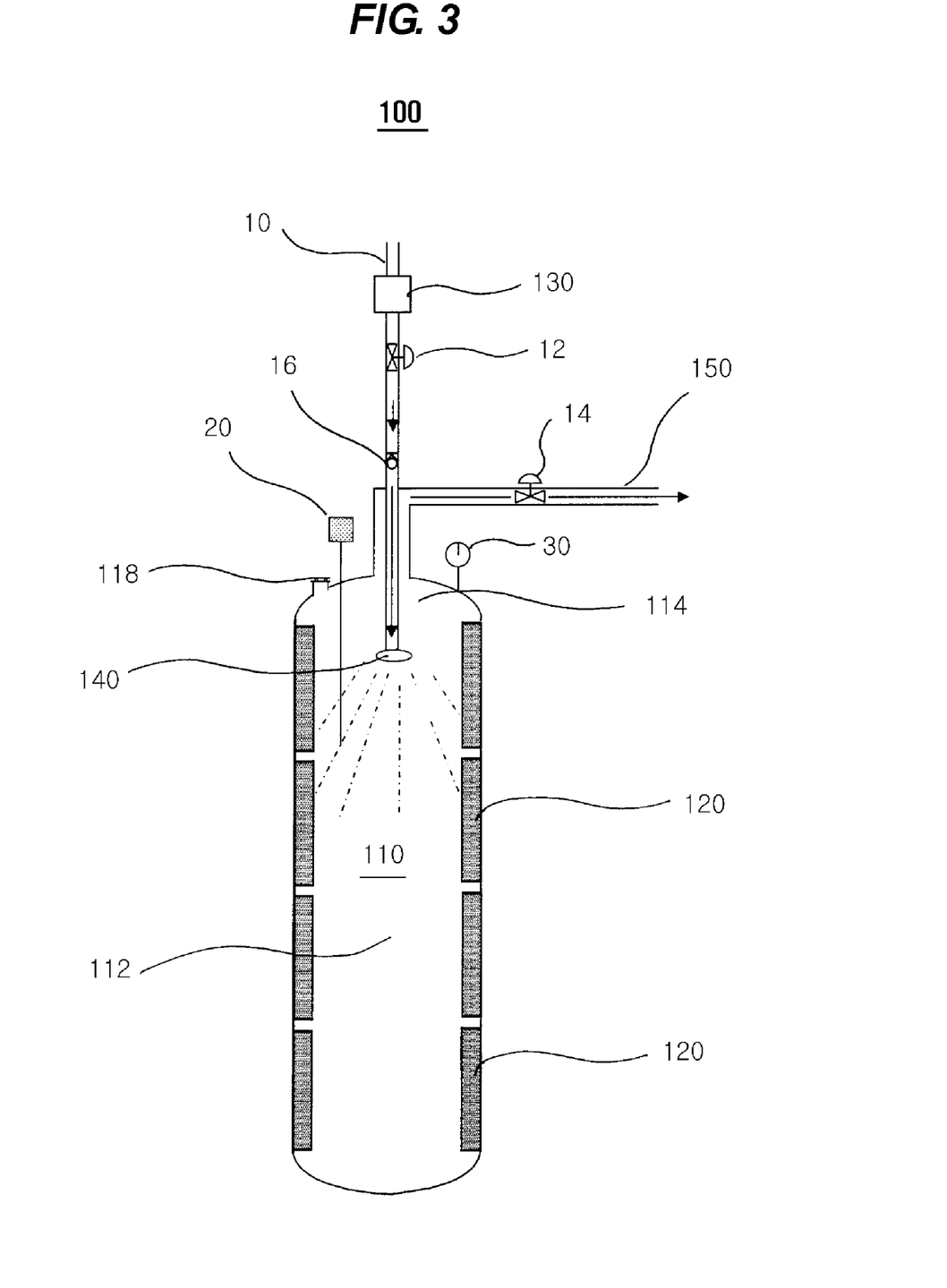
FIG. 3 is a schematic view showing another modified embodiment of the apparatus 100 for generating high temperature steam.

FIG. 3 is a schematic view showing another modified embodiment of the apparatus 100 for generating high temperature steam.

It is illustrated in FIG. 3 that the apparatus 100 for generating high temperature steam according to the present invention further comprises the connecting cap 118 provided in the body 112 of the high pressure container 110. In addition, a lower portion of the body 112 of the high pressure container 110 is in a hermetically sealed state, and the vapor outlet 114 is formed at the upper portion thereof. It is also shown in FIG. 3 that the heat supply unit 120 is installed in the high pressure container 110.

Figure 4:
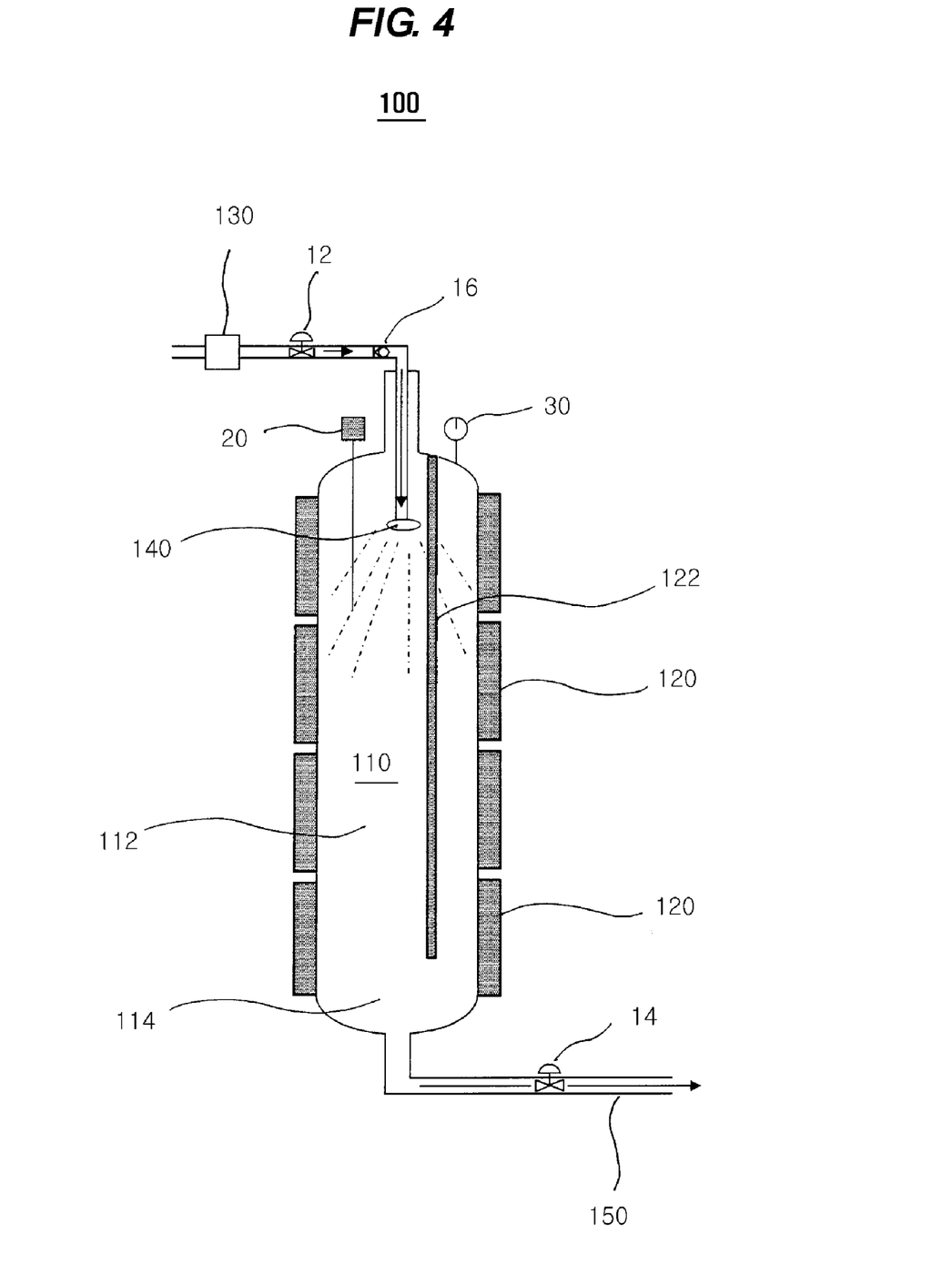
FIG. 4 is a schematic view showing a further modified embodiment of the apparatus 100 for generating high temperature steam.

FIG. 4 schematically shows a further preferred embodiment of the apparatus 100 for generating high temperature steam according to the present invention.

It is shown in FIG. 4 that in a state where the heat supply unit 120 is installed to the outside of the high pressure container 110, the apparatus 100 for generating high temperature steam according to the present invention has the auxiliary heat supply unit 122 provided in the high pressure container 110.

Figure 5:
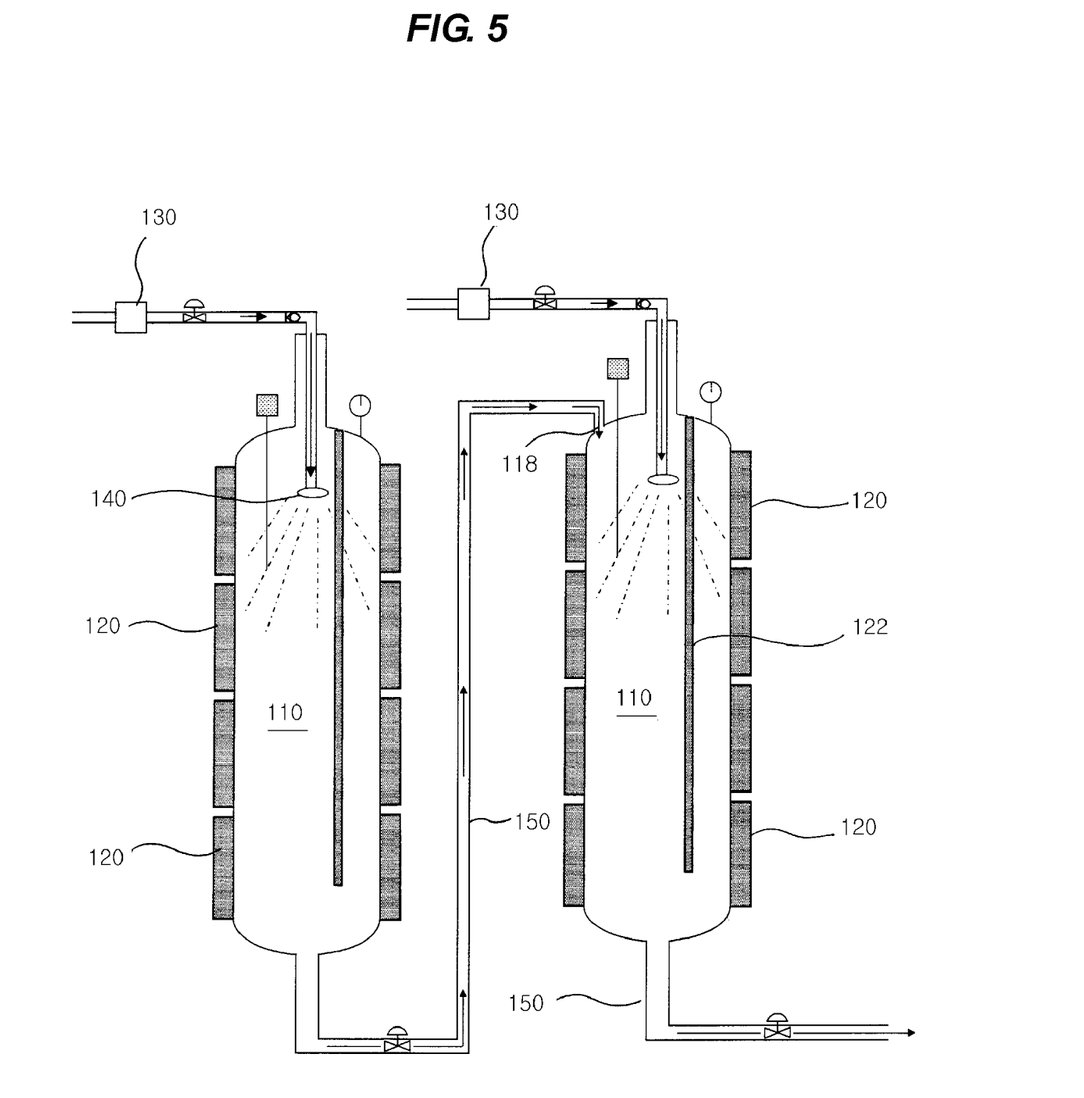
FIG. 5 is a schematic view showing a modified embodiment in which the apparatuses 100 for generating high temperature steam are sequentially connected to each other.

On the other hand, FIG. 5 schematically shows that the apparatuses 100 for generating high temperature steam are sequentially connected to each other, as a still further preferred embodiment of the apparatus 100 for generating high temperature steam according to the present invention. Although FIG. 5 illustrates that two of the apparatuses 100 for generating high temperature steam are connected to each other, the number of the apparatuses 100 may be adjusted, if necessary. That is, two or more of the apparatuses may be connected to each other in serial and used.

The apparatus 100 for generating high temperature steam according to the present invention may be used in a manner as follows. However, the below method is only suggested for enabling those skilled in the art to execute easily the spirit of the present invention, and it will be apparent that the apparatus for generating high temperature steam according to the present invention can be used in various manner according to the specific conditions.

The method of generating high temperature steam according to the present invention can be initiated by placing the aforementioned apparatus 100 for generating high temperature steam at a location at which the apparatus will be employed. At this time, the internal pressure of the high pressure container 110 is the same as the atmospheric pressure, and the high pressure container 110 is in a hermetically sealed state.

In the method of generating high temperature steam according to the present invention, the heat supply unit 120 installed at a periphery of the high pressure container 110 is heated to heat gas in the high pressure container 110. The gas in the high pressure container may be air. The present invention differs from the prior art disclosed in the preceding patent application (Korean patent application No. 10-2007-30126) filed on Mar. 28, 2007 and published as Letters Patent (Registration No. 10-820874) on Apr. 11, 2008 in the name of the inventor of the present invention in that the method of the present invention is performed without injecting additional gas into the high pressure container 110 and pressurizing the interior thereof to a pressure higher than the atmospheric pressure.

In the early stage, according to the present invention, the high pressure container 110 is hermetically sealed at a generally atmospheric pressure and thermal energy is supplied to the high pressure container 110 from the outside. At this time, it is preferable that water be sprayed into the high pressure container 110 to mix waterdrops with air. In this case, internal energy of the gas in the high pressure container 110 is gradually increased by the thermal energy supplied from the outside. As the internal energy of the gas is increased, the gas is gradually expanded to convert internal temperature and pressure of the high pressure container into high temperature and pressure. The water can be continuously supplied to the high pressure container 110. However, more preferably, after some of water is supplied only at an initial time, the water supply is interrupted and then the thermal energy is continuously supplied in a state where the water is not supplied.

In the present invention, water is preferably supplied to the high pressure container 110 from the outside by the water supply pump 130 in a case where while measuring internal temperature and pressure of the high pressure container 110, the measured internal temperature and pressure reaches a predetermined initially set temperature and pressure. At this time, it is preferable that the initially set temperature be 120° C. or more and the initially set pressure be 3 to 5 kg$_f$/cm$^2$. In the present invention, the initially set temperature and/or pressure is to determine the time at which the water is supplied from the outside to the high pressure container 110. If the initially set temperature and/or pressure is high, the water supplied from the outside absorbs a large amount of thermal energy for the unit time. However, if the initially set temperature and/or pressure is too much high, the operating time becomes lengthened. Thus, it is preferable to adjust properly the initially set temperature and/or pressure.

In the present invention, the water supplied by the water supply pump 130 is sprayed by the spray nozzle 140. At this time, the water sprayed by the spray nozzle 140 is divided into fine waterdrops in the high pressure container 110. In such a state, the fine waterdrops are directly exposed to the internal environment of the high pressure container. The water in the form of fine waterdrops adsorbs high temperature heat in the high pressure container 110 through overall surfaces thereof and is vaporized instantaneously into gas molecules, so that the waterdrops are rapidly expanded. Simultaneously, the expansion of the waterdrops allows an internal state of the hermetically sealed high pressure container 110 to be converted into a high pressure state. The above factors cause the synergism to instantaneously fill the inside of the high pressure container 110 with high temperature and pressure vapor and to generate vapor having a high quality.

According to the present invention, the water supply pump 130 may be operated continuously until the internal temperature and/or pressure of the high pressure container 110 reaches the predetermined main set temperature and/or pressure, or may be interrupted for a moment. If the operation of the water supply pump 130 is interrupted for a moment, the internal state of the high pressure container 110 reaches more rapidly the predetermined main set temperature and/or pressure, so that the latter is more preferable. In the present invention, the main set temperature is preferably 150 to 300° C. Preferably, the main set pressure is about 10 to 40 kg/cm². This is because a too low range thereof makes it difficult to obtain the steam having a high quality and a too high range thereof is not preferable in safety of the high pressure container 110.

In the present invention, once the internal state of the high pressure container 110 reaches the predetermined main set temperature and/or pressure, the water supply pump 130 starts to operate again. The water supplied from the outside starts to be sprayed in the shape of fine waterdrops into the high pressure container 110 through the spray nozzle 140. The sprayed fine waterdrops are instantaneously transformed into vapor as described above, and the high pressure container 110 is fully filled with high temperature vapor.

According to the present invention, it is possible to generate abundantly and satisfactorily vapor having a high quality through the aforementioned process according to the final purpose.

The method for generating high temperature steam according to the present invention can be described more specifically and in detail with reference to the steam generating apparatus 100.

As the high pressure container 110 to be used in the steam generating apparatus 100, a cylinder with a length of 1,200 mm, an inner diameter of 150 mm and a volume of 21 liters is selected and the heater band as the heat supply unit 120 is installed onto the outside of the cylinder. A capacity of the heater band is determined to be 3.5 kW×4=14 kW, a pressure of water compressed in the water supply pump 130 is determined to be 80 to 100 kg/cm², and the amount of water sprayed through the spray nozzle 140 under the above pressure is determined to be 2.3 liters/min. In addition, the vapor discharge line 150 is installed at the lower portion of the high pressure container 110. This is completely different from the proceeding patent applications filed in the name of the present inventor in that a gas supplier and a gas supply line are installed in the prior art.

On the other hand, the pipe line 10 for supplying water from the outside is connected to the upper portion of the high pressure container 110, and a water compressor as the water supply pump 130 is installed to the pipe line 10. In addition, the pipe line 10 is equipped with a water opening/closing valve 12 capable of controlling the amount of water to be supplied, and a check valve 16 for preventing water from flowing backward by the steam in the high pressure container 110. The vapor discharge line 150 is installed at the lower portion of the high pressure container 110 to discharge the steam generated in the high pressure container 110 to the outside and a steam opening/closing valve 14 capable of controlling the amount of steam to be discharged is installed to the vapor discharge line 150. Also, a temperature measuring sensor 20 and a pressure measuring sensor 30, which may sense internal temperature and pressure of the high pressure container, respectively, are installed to the high pressure container 110.

In the meantime, if the high pressure container 110 normally generates and discharges the steam, a temperature of the high pressure container 110 is set to be 240° C. and an ON/OFF variation of the heater band 120 is set to be 5° C. That is, power is turned on at a measured temperature of 235° C. and turned off at a measured temperature of 245° C.

In such a state, electrical power is applied to the heater band 120 to supply the thermal energy into the high pressure container 110. Once water starts to be sprayed through the spray nozzle 140, the steam is generated in the high pressure container 110 and the internal pressure of the high pressure container is increased. It takes about 5 seconds for the internal pressure of the high pressure container to reach an initial pressure of 3 to 5 kg/cm². At this time, the water supply is interrupted, electrical power is continuously applied to the heater band 120, and the internal temperature reaches the set temperature of 240° C. At this time, the water is continuously supplied again to the high pressure container 110 through the water supply pump 130 and the internal temperature of the high pressure container 110 is momentarily reduced. The internal temperature of the high pressure container 110 is gradually recovered and approaches the set temperature within 35 to 50 seconds. The internal pressure of the high pressure container 110 is about 27 kg/cm².

In order to use the steam generated in the high pressure container 110, the steam opening/closing valve 14 is opened to discharge the steam until the internal pressure of the high pressure container 110 is reduced to 10 kg/cm². At this time, the steam opening/closing valve 14 is closed to interrupt the discharge of the steam, and the internal temperature and pressure of the high pressure container 110 starts to rise again.

By repeating the aforementioned processes, it is possible to generate a large amount of high temperature steam through the high pressure container 110.

In a case where the steam is generated using the steam generating apparatus 100 according to the present invention, the amount and quality of water vapor which is finally generated can be controlled by adjusting the internal temperature and pressure of the high pressure container 110. Generally, the steam of high temperature and pressure can be more sufficiently obtained by spraying water under conditions where the internal temperature and pressure of the high pressure containers 110 are maintained at high temperature and pressure.

Steam of high temperature and pressure obtained according to the present invention can be widely used as various kinds of heat media in industrial fields.

Upon use of the steam generating apparatus according to the present invention, there are advantages in that steam in a wide temperature range can be obtained and desired steam can be obtained within a remarkable short time.

In addition, upon use of the steam generating apparatus according to the present invention, there is an advantage in that steam with an ultra-high temperature (e.g., 200° C. or more) that has not been obtainable by means of a conventional method.

Moreover, in a case where the steam generating apparatus according to the present invention is used, thermal efficiency can be maximized and the energy can be remarkably reduced since steam is obtained by bringing input heat into direct contact with fine waterdrops.

Furthermore, upon use of the apparatus for generating steam according to the present invention, facility costs can be greatly reduced since there is no need for use of a boiler with large capacity. In addition, there is an advantage in that since there is no need for use of a boiler with large capacity and thus fossil fuel is not used, a problem of environmental pollution can be solved.

Although the method and apparatus for generating steam according to the present invention has been described in detail above, the descriptions merely illustrate the most preferred embodiments of the present invention and the present invention is not limited thereto. The scope of the present invention is defined by the appended claims.

Further, it will be apparent that those skilled in the art can make various changes and modifications from the descriptions of the specification and the changes and modifications fall within the scope of the present invention.

What is claimed is:

1. A method for generating high temperature steam using an apparatus for forming high temperature steam comprising a high pressure container including a hollow body having a certain volume and sealed shape and a vapor outlet formed at an upper or lower portion of the body for discharging vapor generated therein, a heat supply unit for supplying high temperature heat to the high pressure container, a water supply pump positioned at an outside of the high pressure container and supplying the high pressure container with water from an outside, a spray nozzle for spraying the water supplied from the water supply pump to the high pressure container, and a vapor discharge line connected to the outlet of the high pressure container to guide the vapor generated in the body, the method comprising the steps of:

allowing an internal state of the high pressure container to reach a predetermined pressure or temperature; and spraying water supplied from the outside into the high pressure container if the internal state of the high pressure container reaches the predetermined pressure or temperature.

2. The method as claimed in claim 1, wherein the high pressure container has an initial set internal pressure of 3 to 5 kgf/cm2.

3. The method as claimed in claim 1, wherein the high pressure container has an initial set internal temperature of 120° C. or more.

4. The method as claimed in claim 1, wherein the heat supply unit continuously supplies thermal energy to the high pressure container after the internal state of the high pressure container reaches the predetermined pressure or temperature.

5. The method as claimed in claim 4, wherein the predetermined pressure of the high pressure container is 10 to 40 kgf/cm2.

6. The method as claimed in claim 4, wherein the predetermined temperature of the high pressure container is 150 to 300° C.

* * * * *